US011668205B2

(12) United States Patent
Guymon et al.

(10) Patent No.: US 11,668,205 B2
(45) Date of Patent: Jun. 6, 2023

(54) CONTAINMENT SYSTEMS FOR ENGINE

(71) Applicant: HONEYWELL INTERNATIONAL INC., Charlotte, NC (US)

(72) Inventors: Jeffrey Guymon, Phoenix, AZ (US); Brian Walker, Phoenix, AZ (US); Manuel Sandoval, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/170,230

(22) Filed: Feb. 8, 2021

(65) Prior Publication Data

US 2022/0251969 A1 Aug. 11, 2022

(51) Int. Cl.

*F01D 21/04* (2006.01)
*F01D 25/24* (2006.01)
*F02C 7/22* (2006.01)

(52) U.S. Cl.

CPC ........... *F01D 21/045* (2013.01); *F01D 25/24* (2013.01); *F05D 2220/323* (2013.01); *F05D 2240/14* (2013.01); *F05D 2250/191* (2013.01); *F05D 2250/291* (2013.01)

(58) Field of Classification Search

CPC .. F05D 2250/191; F01D 21/045; F01D 25/24; F01D 25/26; F01D 11/127
See application file for complete search history.

(56) References Cited

U.S. PATENT DOCUMENTS

| | | | | |
|---|---|---|---|---|
| 8,029,231 | B2 * | 10/2011 | Evans | F01D 25/24 415/9 |
| 8,578,697 | B2 * | 11/2013 | Harper | F02K 3/06 244/53 B |
| 9,032,706 | B2 | 5/2015 | Marshall | |
| 2003/0156940 | A1 * | 8/2003 | Czachor | F01D 21/045 415/119 |
| 2009/0155044 | A1 | 6/2009 | Xie et al. | |
| 2011/0167606 | A1 | 7/2011 | Shutrump | |
| 2011/0217156 | A1 * | 9/2011 | Mcmillan | F02K 3/06 415/9 |
| 2015/0275695 | A1 * | 10/2015 | Evans | F01D 25/243 415/9 |
| 2016/0208640 | A1 * | 7/2016 | Drozdz | F01D 21/045 |
| 2016/0341070 | A1 * | 11/2016 | Garcia | F04D 29/023 |

(Continued)

FOREIGN PATENT DOCUMENTS

| | | |
|---|---|---|
| EP | 1336739 A2 | 8/2003 |
| EP | 1726788 A2 | 11/2006 |
| WO | 0144625 A1 | 6/2001 |

*Primary Examiner* — Richard A Edgar
*Assistant Examiner* — Michael K. Reitz
(74) *Attorney, Agent, or Firm* — Lorenz & Kopf, LLP

(57) ABSTRACT

A containment system for an engine includes an engine case having an inner perimeter. The containment system includes a containment ring nested within the inner perimeter of the engine case and integrally formed with the engine case along a first interface and a second interface. The containment ring includes a first leg opposite a second leg, and the first interface is defined between the first leg and the engine case. The containment system includes a first plurality of perforations defined at the first interface, and the first leg of the containment ring is frangible along the first plurality of perforations to at least partially release the containment ring to protect the engine case during a containment event.

20 Claims, 9 Drawing Sheets

(56) References Cited

U.S. PATENT DOCUMENTS

| | | | | |
|---|---|---|---|---|
| 2018/0258796 | A1* | 9/2018 | Jain | F01D 21/045 |
| 2020/0165936 | A1 | 5/2020 | Kasai et al. | |
| 2020/0200038 | A1 | 6/2020 | Hall et al. | |
| 2020/0248557 | A1* | 8/2020 | Snider | F01D 5/20 |
| 2020/0308986 | A1 | 10/2020 | Slayter et al. | |

* cited by examiner

CONTAINMENT SYSTEMS FOR ENGINE

TECHNICAL FIELD

The present disclosure generally relates to containment systems for use with engines, and more particularly relates to containment systems for a gas turbine engine, in which frangible containment rings are integrally formed with an engine case.

BACKGROUND

Containment rings can be employed with certain rotating devices to contain the rotating device during an event. For example, gas turbine engines include turbines and compressors. The turbines and compressors associated with the gas turbine engine can each include rotors, which can rotate at high speeds. In certain instances, each of the rotors can be surrounded by a containment ring, which can ensure the safe operation of the turbine and/or compressor. Generally, the containment of rotors is subject to federal requirements. In order to comply with the federal requirements, containment rings may have a large mass and have to be connected to a structure of the gas turbine engine with flanges, which further increase a mass associated with containment.

Accordingly, it is desirable to provide a containment system that provides containment and has a reduced mass. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a containment system for an engine. In one example, the containment system includes an engine case having an inner perimeter. The containment system includes a containment ring nested within the inner perimeter of the engine case and integrally formed with the engine case along a first interface and a second interface. The containment ring includes a first leg opposite a second leg, and the first interface is defined between the first leg and the engine case. The containment system includes a first plurality of perforations defined at the first interface, and the first leg of the containment ring is frangible along the first plurality of perforations to at least partially release the containment ring to protect the engine case during a containment event.

The second interface is frangible relative to the engine case to at least partially release the containment ring during the containment event to protect the engine case. A second plurality of perforations are defined at the second interface between the second leg and the engine case, and the containment ring is frangible along the second plurality of perforations. The containment ring includes a body, with a first body end of the body coupled to the first leg and a second body end of the body coupled to the second leg, and the second interface is defined between the body and the engine case at the second body end. The second interface is defined between the second leg and the engine case. The first plurality of perforations extends about a circumference of the containment ring at the first interface. The containment system includes a second containment ring, the second containment ring integrally formed with the engine case along a third interface. The third interface is frangible relative to the engine case to at least partially release the second containment ring during the containment event to protect the engine case. The second containment ring is integrally formed with the containment ring such that the second containment ring is connected to the containment ring. The second containment ring extends axially beyond a perimeter of the engine case. The engine case has a first case end opposite a second case end, the first case end has a first diameter that is different than a diameter of the engine case defined between the first case end and the second case end, and the containment ring is nested within the inner perimeter of the engine case at the diameter. The engine case defines a plurality of bores proximate the diameter, which are each configured to receive a fuel nozzle associated with the engine. The containment ring is hollow. The second leg of the containment ring includes at least one exit hole.

Further provided is a containment system for an engine. The containment system includes an engine case having an inner perimeter and an outer perimeter that defines an exterior surface for the engine. The containment system includes a containment ring nested within the inner perimeter of the engine case and integrally formed with the engine case along a first interface and a second interface. The containment ring includes a body with a first leg and a second leg on opposed sides of the body. The first interface is defined between the first leg and the engine case, and the second interface is defined between the body or the second leg. The containment system includes a first plurality of perforations defined at the first interface, and the first leg of the containment ring is frangible along the first plurality of perforations to at least partially release the containment ring to protect the engine case during a containment event. The containment system includes a second plurality of perforations defined at the second interface, and the containment ring is frangible along the second plurality of perforations.

The body has a first body end coupled to the first leg and a second body end coupled to the second leg, and the second interface is defined between the body and the engine case at the second body end. The second interface is defined between the second leg and the engine case. The containment system includes a second containment ring. The second containment ring is integrally formed with the engine case along a third interface and the third interface is frangible relative to the engine case to at least partially release the second containment ring during the containment event to protect the engine case. The second containment ring is integrally formed with the containment ring such that the second containment ring is connected to the containment ring and the second containment ring extends axially beyond a perimeter of the engine case. The engine case has a first case end opposite a second case end, the first case end has a first diameter that is different than a diameter of the engine case defined between the first case end and the second case end, and the containment ring is nested within the inner perimeter of the engine case at the diameter.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
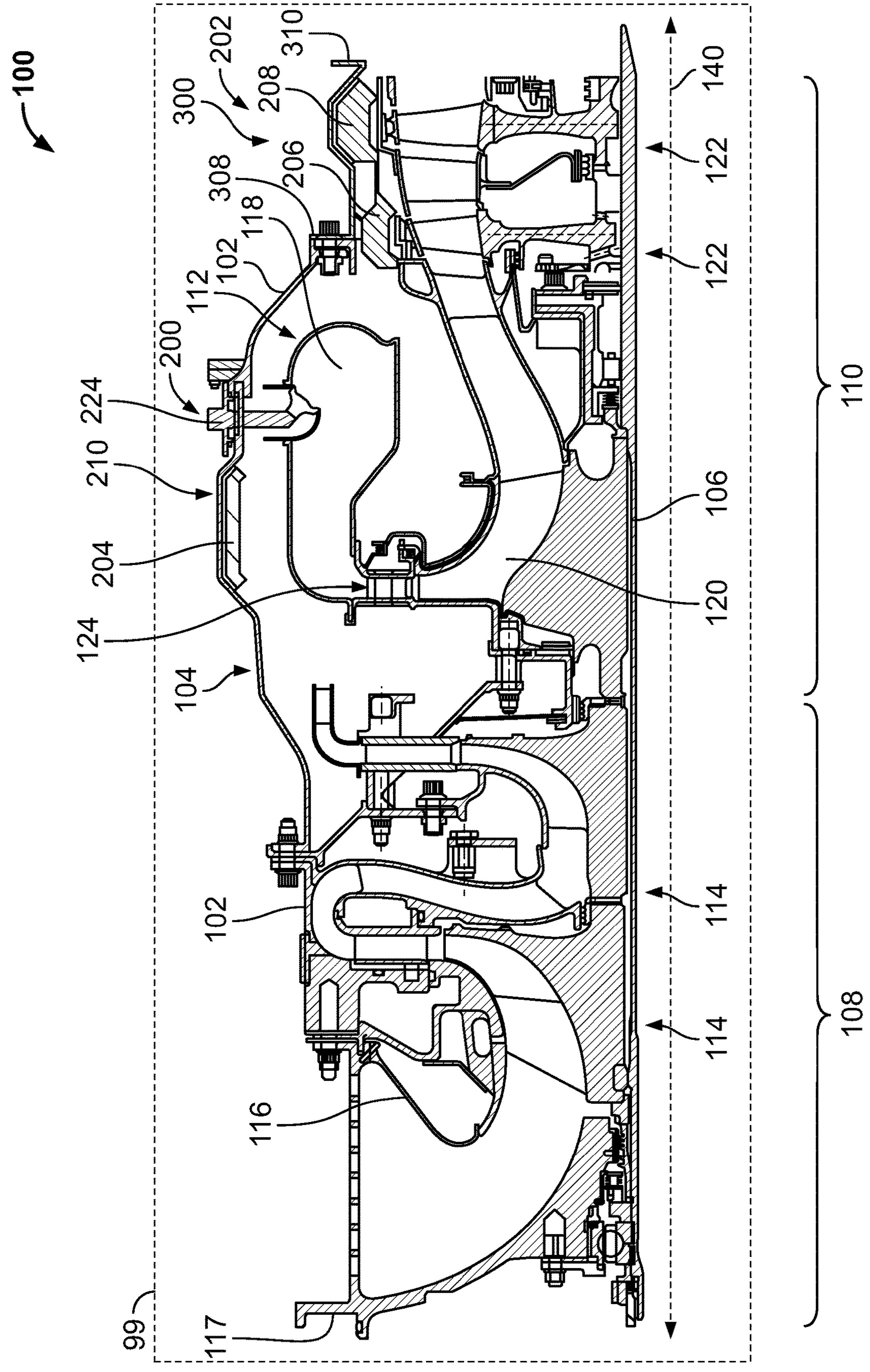
FIG. 1 is a schematic cross-sectional illustration of an engine, such as a gas turbine engine, which includes an exemplary containment systems in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of structure or device requiring containment during operation, and that the example of a gas turbine engine is merely one exemplary embodiment according to the present disclosure. In addition, while the containment system is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel. Also as used herein, the terms "integrally formed" and "integral" mean one-piece and exclude brazing, fasteners, or the like for maintaining portions thereon in a fixed relationship as a single unit.

With reference to FIG. 1, a simplified cross-sectional view of an exemplary gas turbine engine 100 is shown with the remaining portion of the gas turbine engine 100 being axisymmetric about a longitudinal axis 140, which also comprises an axis of rotation for the gas turbine engine 100. As will be discussed herein, the gas turbine engine 100 includes a first containment system 200 and a second containment system 202 according to various embodiments. The first containment system 200 and the second containment system 202 may be collectively referred to as a containment system for the gas turbine engine 100. The first containment system 200 and the second containment system 202 reduce the total mass associated with the gas turbine engine 100, while providing sufficient containment during a containment event. In addition, the first containment system 200 and the second containment system 202 reduce additional parts needed to provide containment, as the first containment system 200 and the second containment system 202 are integrally formed and are coupled to adjacent engine case sections 102 to form an engine case 104 that substantially encloses the gas turbine engine 100 and forms an exterior surface of the gas turbine engine 100. In addition, the first containment system 200 and the second containment system 202 are configured to include a respective frangible containment ring 204, 206, 208, which at least partially releases, breaks or fractures to protect the engine case 104. It should be noted that while the first containment system 200 and the second containment system 202 are illustrated and described herein as being used with the gas turbine engine 100, which can be included with an auxiliary power unit, the first containment system 200 and the second containment system 202 can be employed with various types of engines, including, but not limited to, turbofan, turboprop, turboshaft, and turbojet engines, whether deployed onboard an aircraft, watercraft, or ground vehicle (e.g., a tank), included within industrial power generators, or utilized within another platform or application. In this example, the gas turbine engine 100 is employed within an aircraft 99.

In the example shown in FIG. 1, the gas turbine engine 100 is illustrated as a two spool engine. It should be noted that the use of a two spool engine is merely exemplary, as any number of spools can be employed. A tie-shaft 106 extends along an axis of rotation or longitudinal axis 140 of the gas turbine engine 100. In this example, the gas turbine engine 100 includes a compressor section 108, a combustion section 112, and a turbine section 110. In certain examples, the compressor section 108 includes one or more compressors 114, which are mounted to an upstream or forward end of the tie-shaft 106. The compressors 114 are in communication with a compressor section duct 116 to receive airflow from an intake section 117 of the gas turbine engine 100. The compressors 114 pressurize the air in the compressor section duct 116, and the compressor section duct 116 is in communication with the combustion section 112 to deliver the compressed air to a combustion chamber 118 of the combustion section 112.

The combustion section 112 includes the combustion chamber 118. The compressed air from the compressor section 108 is mixed with fuel and ignited to produce combustive gases in the combustion chamber 118. The combustive gases are directed from the combustion chamber 118 to the turbine section 110. The turbine section 110 includes at least one radial or axial turbine, and in this example, includes a radial turbine 120 and at least one axial turbine 122, which are mounted to an opposing, aft end of the tie-shaft 106 as the turbine for the gas turbine engine 100. The turbine section 110 also includes a turbine nozzle 124, which is in fluid communication with the combustion section 112 to receive combustion gases from the combustion chamber 118. The turbine nozzle 124 directs the combustion gases through the radial turbine 120 and the axial turbines 122.

The combustion gases drive rotation of the turbine, which in this example incudes the radial turbine 120 and the axial turbines 122, and the rotation of the turbine drives further rotation of the tie-shaft 106 and the compressors 114. The rotation of the rotating group provides power output, which may be utilized in a variety of different manners, depending upon whether the gas turbine engine 100 assumes the form of a turbofan, turboprop, turboshaft, turbojet engine, or an auxiliary power unit, to list but a few examples.

In this example, the first containment system 200 surrounds a portion of the combustion chamber 118 and the radial turbine 120, and the second containment system 202 surrounds the axial turbines 122. The first containment system 200 protects the engine case 104 and captures liberated pieces in the event of an issue with the radial turbine 120 requiring containment or the absorption of energy, and the second containment system 202 protects the engine case 104 and captures liberated pieces in the event of an issue with the axial turbines 122 requiring containment or the absorption of energy. Thus, generally, the first containment system 200 and the second containment system 202 each surround a rotating component, the radial turbine 120 and the axial turbines 122, to provide containment during an event.

Figure 2:
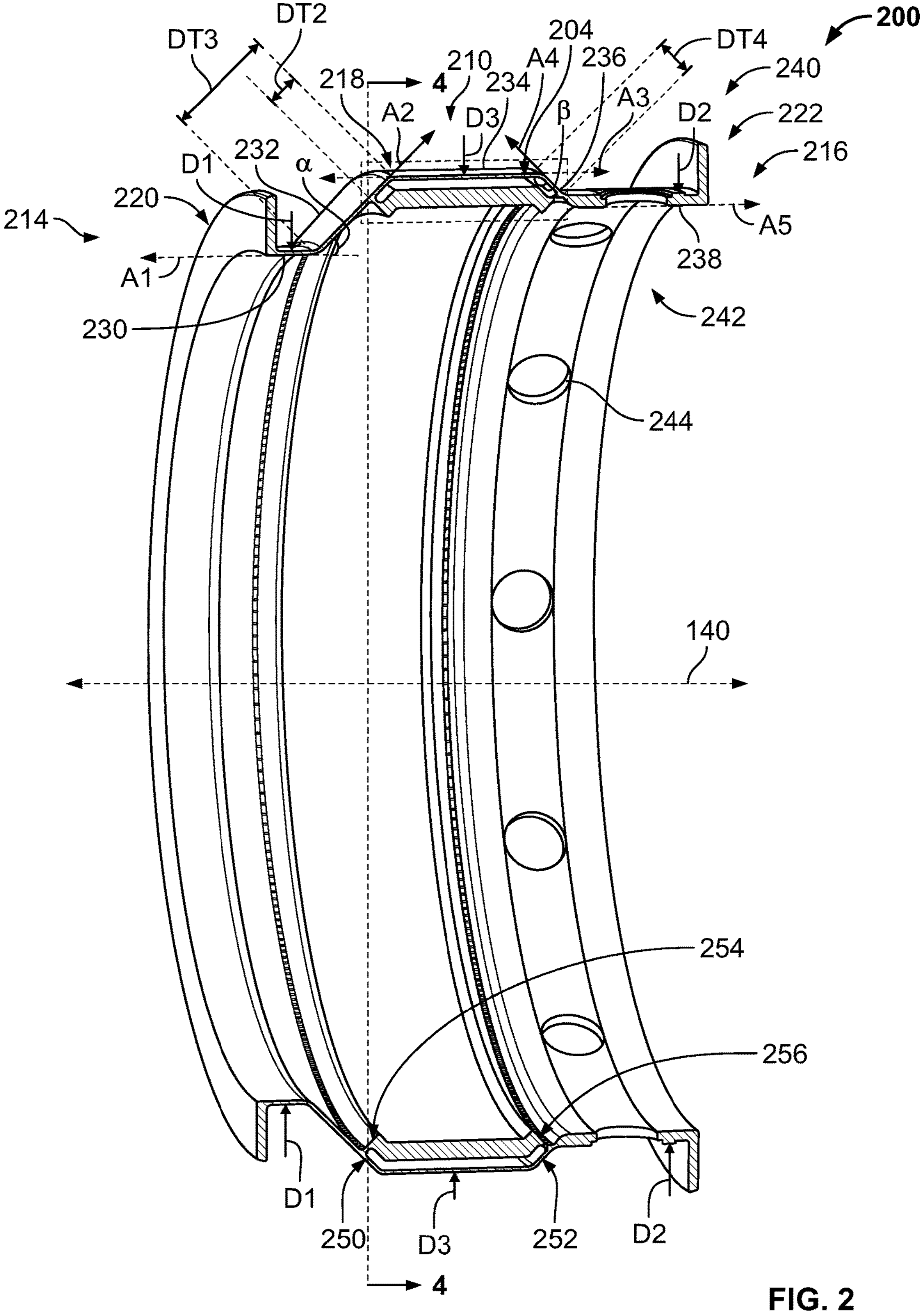
FIG. 2 is a cross-sectional illustration of a first containment system, taken along a plane parallel to a longitudinal axis of the gas turbine engine looking into the page of FIG. 1.

With reference to FIG. 2, the first containment system 200 is shown in greater detail. In one example, the first containment system 200 includes an engine case section 210 and the containment ring 204. In this example, the containment ring 204 is integrally formed, monolithic, or one-piece with the engine case section 210. The containment ring 204 and the engine case section 210 are composed of a metal or metal alloy, including, but not limited to, Inconel 718. In one example, the containment ring 204 and the engine case section 210 are formed using additive manufacturing, including, but not limited to direct metal laser sintering (DMLS), laser powder bed fusion (L-PBF), electron powder bed fusion (E-PBF) or electron beam melting (EBM). As will be discussed, the containment ring 204 is frangible, and breaks or fractures to release all or a portion of the containment ring 204 from the engine case section 210 during a containment event.

In this example, the engine case section 210 includes a first case end 214 opposite a second case end 216 and a case wall 218 that interconnects the first case end 214 and the second case end 216. The first case end 214 includes a flange 220, which extends radially from the first case end 214. The flange 220 is coupled to the adjacent engine case section 102 (FIG. 1) to form the engine case 104 (FIG. 1). The second case end 216 includes a second flange 222. The second flange 222 extends radially from the second case end 216 and is coupled to the adjacent engine case section 102 (FIG. 1) to form the engine case 104 (FIG. 1).

The case wall 218 transitions from a first diameter D1 at the first case end 214 to a second diameter D2 at the second case end 216, and the first diameter D1 is different, and less than, the second diameter D2. The case wall 218 also has a third diameter D3 defined between the first diameter D1 at the first case end 214 and the second diameter D2 at the second case end 216. The third diameter D3 is different than the first diameter D1 and the second diameter D2, and is greater than the first diameter D1 and the second diameter D2. The second diameter D2 is greater than the first diameter D1, and less than the third diameter D3 to accommodate one or more fuel nozzles 224 (FIG. 1) associated with the combustion section 112. The third diameter D3 is greater than the first diameter D1 and the second diameter D2 to accommodate the containment ring 204. Stated another way, by forming the containment ring 204 with the engine case section 210, the diameter D1, D2 of the engine case section 210 may be reduced forward and aft of the containment ring 204, which reduces a weight of the engine case section 210.

The case wall 218 includes a first portion 230, a second portion 232, a third portion 234, a fourth portion 236 and a fifth portion 238. The case wall 218 also has an exterior surface 240 and an interior surface 242. The first portion 230 is coupled or formed with the second portion 232 and the flange 220 at the first case end 214. The first portion 230 extends along an axis A1, which is substantially parallel to the longitudinal axis 140. The second portion 232 is coupled or formed with the first portion 230 and the third portion 234. The second portion 232 extends along an axis A2, which is transverse to the axis A1 and the longitudinal axis 140. In one example, the second portion 232 is at an acute angle, which in this example, is an angle $\alpha$ of about 40 to about 50 degrees relative to the axis A1. In one example, the angle $\alpha$ is about 45 degrees. The second portion 232 transitions the case wall 218 from the first diameter D1 to the third diameter D3. As will be discussed, the second portion 232 is coupled to the containment ring 204 along the interior surface 242 of the second portion 232. The third portion 234 is coupled or formed with the fourth portion 236. The third portion 234 extends along an axis A3, which is transverse to the axis A2 and substantially parallel to the longitudinal axis 140. The third portion 234 defines the third diameter D3. In this example, the third portion 234 is radially outboard of the containment ring 204. Stated another way, the containment ring 204 is nested within the perimeter of the case wall 218 so as to be radially inboard of the third portion 234.

The fourth portion 236 is coupled to or formed with the third portion 234 and the fifth portion 238. The fourth portion 236 transitions from the third diameter D3 to the second diameter D2. The fourth portion 236 extends along an axis A4, which is transverse to the axis A3 and the longitudinal axis 140. In one example, the fourth portion 236 is at an acute angle, which in this example, is an angle $\beta$ of about 40 to about 50 degrees relative to the axis A3. In one example, the angle $\beta$ is about 45 degrees. As will be discussed, the fourth portion 236 is coupled to the containment ring 204 along the interior surface 242 of the fourth portion 236. The fifth portion 238 is coupled or formed with the fourth portion 236 and the second flange 222 at the second case end 216. The fifth portion 238 extends along an axis A5, which is substantially parallel to the longitudinal axis 140. The fifth portion 238 defines a plurality of bores 244, which are sized to receive a respective one of a plurality of fuel nozzles 224 (FIG. 1) associated with the combustion section 112.

Figure 3:
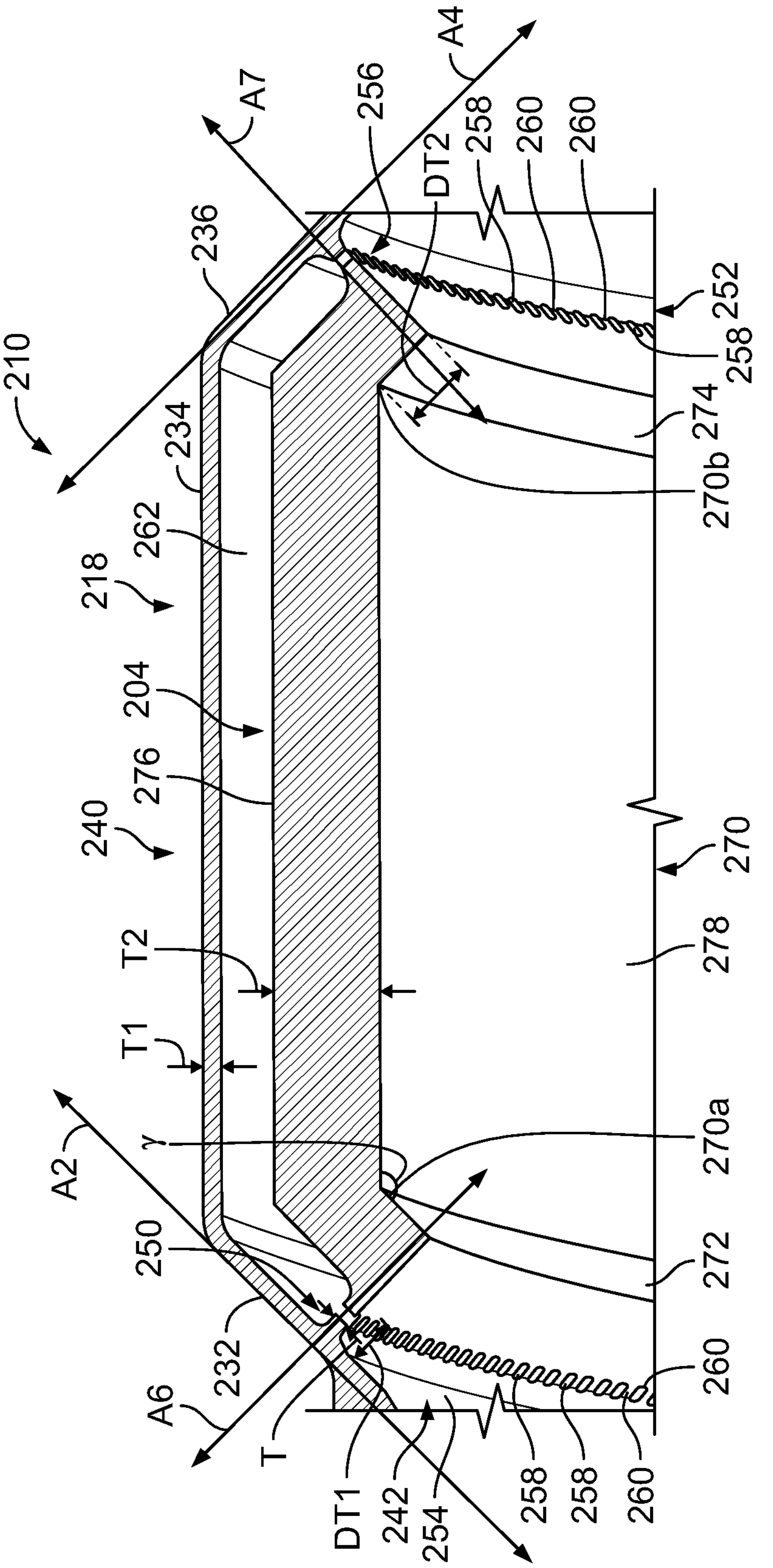
FIG. 3 is a detail cross-sectional view of the first containment system of FIG. 2, taken at 3 on FIG. 2.

The exterior surface 240 of the case wall 218 is opposite the interior surface 242. The exterior surface 240 defines a portion of an outer perimeter of the engine case 104 (FIG. 1). In this example, the interior surface 242 faces a portion of the combustion section 112. The interior surface 242 of the case wall 218 is coupled to the containment ring 204 at the second portion 232 and the fourth portion 236. In one example, the interior surface 242 of the second portion 232 and the fourth portion 236 is coupled to or formed with the containment ring 204 via a respective one of a first plurality of perforations 250 and a second plurality of perforations 252. With reference to FIG. 3, a detail view of the case wall 218 and the containment ring 204 is shown. In one example, each of the first plurality of perforations 250 and the second plurality of perforations 252 include holes 258 and ligaments 260. The holes 258 are circular in this example, and are defined along a respective one of a first interface 254 and a second interface 256. It should be noted that the holes 258 of each of the first plurality of perforations 250 and the second plurality of perforations 252 may have any predetermined hole configuration, including, but not limited to, an oval, racetrack, rectangular, diamond or polygonal shape. In one example, the first plurality of perforations 250 and the second plurality of perforations 252 include about 300 to about 500 holes 258, which have a diameter of about 0.03 inches (in.) to about 0.10 inches (in.). The holes 258 defined along the first interface 254 and the second interface 256 result in the plurality of ligaments 260 disposed between adjacent ones of the plurality of holes 258. The ligaments 260 interconnect the case wall 218 with the containment ring 204 and are frangible, such that each of the ligaments 260 break or fracture to release at least a portion of the containment ring 204 from the engine case section 210. Generally, each of the ligaments 260 are defined by a predetermined thickness, which is based on a production capability of the additive manufacturing device and the material from which the engine case section 210 and the containment ring 204 is composed. In one example, each of the ligaments 260 has a thickness of about 0.040 inches (in.), and the holes 258 of each of the first plurality of perforations 250 and the second plurality of perforations 252 are defined about a perimeter or circumference of the engine case section 210 to result in each of the ligaments 260 having substantially the same thickness.

Figure 4:
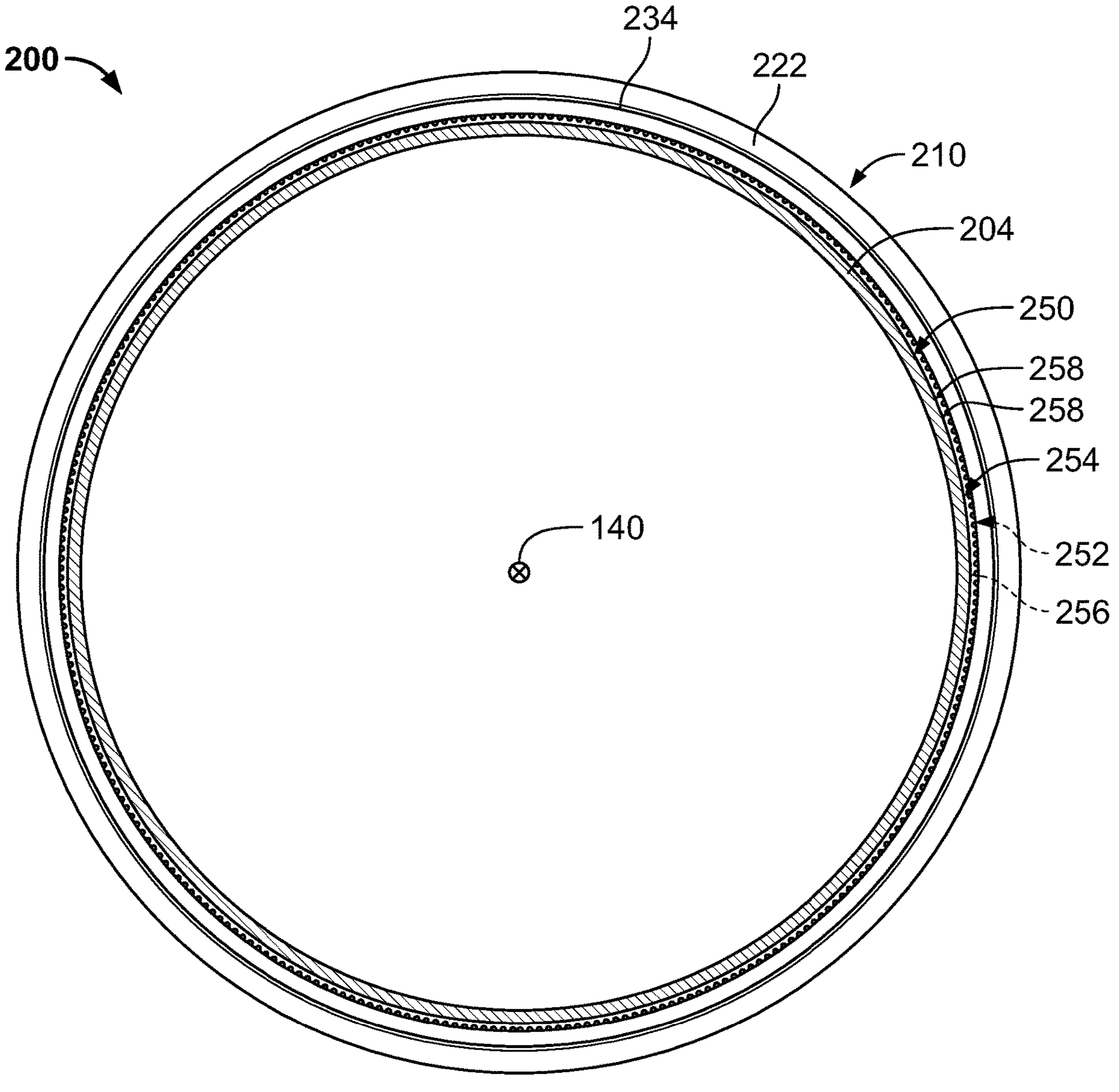
FIG. 4 is a cross-sectional view of the first containment system of FIG. 2, taken along line 4-4 of FIG. 2.

With reference to FIG. 4, each of the first plurality of perforations 250, the second plurality of perforations 252, the first interface 254 and the second interface 256 extend about the perimeter or circumference of the engine case section 210. In this example, the first plurality of perforations 250 and the second plurality of perforations 252 are evenly spaced about the perimeter or circumference of the first interface 254 and the second interface 256, respectively, however, in other embodiments, the first plurality of perforations 250 and/or the second plurality of perforations 252 may be unevenly spaced about the perimeter of the engine case section 210. In this example, with reference back to FIG. 3, the first interface 254 is defined as a section of material formed between the second portion 232 and the containment ring 204, and the second interface 256 is defined as a section of material formed between the fourth portion 236 and the containment ring 204. The first interface 254 interconnects the containment ring 204 to the case wall 218 at the second portion 232, and the second interface 256 interconnects the containment ring 204 to the case wall 218 at the fourth portion 236.

Generally, each of the first interface 254 and the second interface 256 have a thickness T, which is different, and less than, a wall thickness T1 of the case wall 218 and different, and less than, a thickness T2 of the containment ring 204. In certain examples, the thickness T of the first interface 254 and the second interface 256 may be the same as the thickness T1 of the case wall 218. The first interface 254 and the second interface 256 each extend for a distance DT1, which is predetermined to provide for a gap 262 to be defined between the containment ring 204 and the interior surface 242 of the case wall 218. The gap 262 provides a volume for the containment ring 204 to deform, release, break or fracture from the engine case section 210 without cracking, ripping, or breaking the engine case section 210. This ensures that the engine case 104 remains intact during a containment event. The first interface 254 is defined so as to extend along an axis A6, which is substantially perpendicular to the axis A2 of the second portion 232 and the longitudinal axis 140 (FIG. 2). In one example, the first interface 254 is defined at about a 90 degree angle relative to the second portion 232. The second interface 256 is defined so as to extend along an axis A7, which is substantially perpendicular to the axis A4 of the fourth portion 236 and the longitudinal axis 140 (FIG. 2). In one example, the second interface 256 is defined at about a 90 degree angle relative to the fourth portion 236.

With continued reference to FIG. 3, the containment ring 204 defines a substantially C-shape, and includes a body 270, a first leg 272 and a second leg 274. The first leg 272 is coupled to or formed with a first body end 270*a* of the body 270, and the second leg 274 is coupled to or formed with a second body end 270*b* of the body 270. The first leg 272 defines a first side of the containment ring 204, and the second leg 274 defines a second side of the containment ring 204. The first leg 272 and the second leg 274 each extend at an angle $\gamma$ relative to the body 270. In one example, angle $\gamma$ is about 40 to about 50 degrees, and may be about 45 degrees. Each of the first leg 272 and the second leg 274 extend for a distance DT2. The distance DT2 is different, and less than, a distance DT3 of the second portion 232 and is different and less than a distance DT4 of the fourth portion 236. The distance DT2 of the first leg 272 and the second leg 274 is predetermined such that the containment ring 204 is substantially nested within the engine case section 210 along the diameter D3, with the second leg 274 extending slightly beyond the interior surface 242 of the fifth portion 238. By extending beyond the fifth portion 238, the second leg 274 assists in providing containment. The containment ring 204 also includes a first ring surface 276 opposite a second ring surface 278. The first ring surface 276 faces the interior surface 242 of the engine case section 210, and the second ring surface 278 faces toward the combustion chamber 118 and the radial turbine 120. The first ring surface 276 of the containment ring 204 at the first leg 272 is coupled to the first interface 254, and the first ring surface 276 at the second leg 274 is coupled to the second interface 256. The first interface 254 is defined between the engine case section 210 and the first leg 272 along the first ring surface 276 at an end of the first leg 272. The second interface 256 is defined between the engine case section 210 and the second leg 274 along the first ring surface 276 at an end of the second leg 274. In other examples, the first interface 254 and the second interface 256 may be formed at other locations along the first ring surface 276 of the first leg 272 and the second leg 274, respectively.

Figure 5:
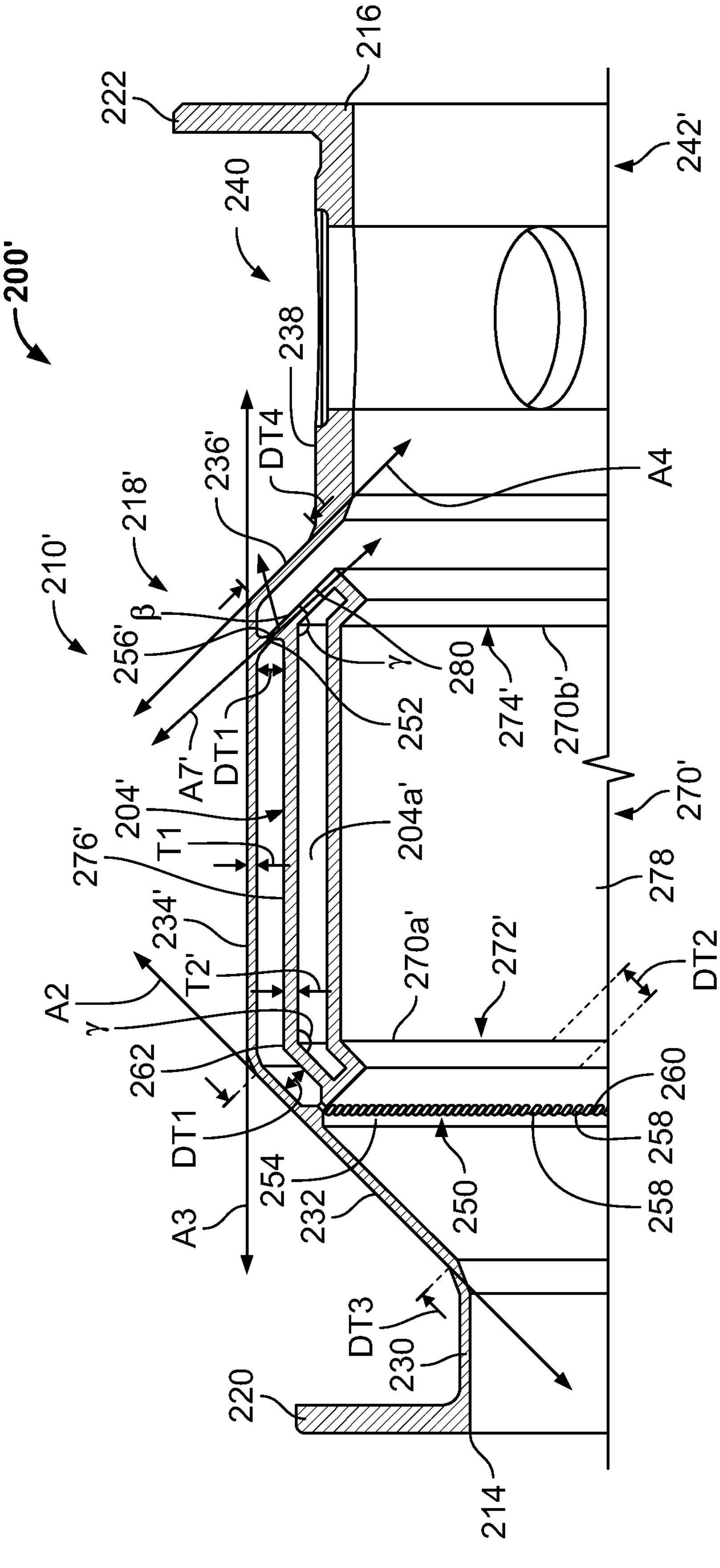
FIG. 5 is a detail cross-sectional view of another exemplary first containment system from the perspective of 3 on FIG. 2.

In the example of FIGS. 1-4, the containment ring 204 is solid, such that the body 270, the first leg 272 and the second leg 274 are solid between the first ring surface 276 and the second ring surface 278. It should be noted that in other embodiments, the containment ring 204 may be configured differently. For example, with reference to FIG. 5, a first containment system 200' is shown, which is also axisymmetric about the longitudinal axis 140 (FIG. 1). As the first containment system 200' includes features that are substantially similar to or the same as the first containment system 200 discussed with regard to FIGS. 1-4, the same reference numerals will be used to denote the same or similar features. The first containment system 200' includes an engine case section 210' and a containment ring 204'. In this example, the containment ring 204' is integrally formed, monolithic, or one-piece with the engine case section 210'. The containment ring 204' and the engine case section 210' are composed of a metal or metal alloy, including, but not limited to, Inconel 718. In one example, the containment ring 204' and the engine case section 210' are formed using additive manufacturing, including, but not limited to direct metal laser sintering (DMLS), laser powder bed fusion (L-PBF), electron powder bed fusion (E-PBF) or electron beam melting (EBM). As will be discussed, the containment ring 204' is frangible, breaks or fractures to release all or a portion of the containment ring 204' from the engine case section 210' during a containment event.

In this example, the engine case section 210' includes the first case end 214 opposite the second case end 216 and a case wall 218' that interconnects the first case end 214 and the second case end 216. The case wall 218' transitions from the first diameter D1 (not shown) at the first case end 214 to the second diameter D2 at the second case end 216 (not shown). The case wall 218 also has the third diameter D3 (not shown) defined between the first diameter D1 and the second diameter D2. The case wall 218' includes the first portion 230, the second portion 232, a third portion 234', a fourth portion 236' and the fifth portion 238. The case wall 218' also has the exterior surface 240 and an interior surface 242'.

The third portion 234' is coupled or formed with the fourth portion 236. The third portion 234' extends along the axis A3, which is transverse to the axis A2 and substantially parallel to the longitudinal axis 140 (FIG. 1). The third portion 234' defines the third diameter D3. In this example, the third portion 234' is radially outboard of the containment ring 204'. Stated another way, the containment ring 204' is nested within the perimeter of the case wall 218' so as to be radially inboard of the third portion 234'. In this example, the third portion 234' is coupled to the containment ring 204' along the interior surface 242' of the third portion 234'. The fourth portion 236' is coupled to or formed with the third portion 234' and the fifth portion 238. The fourth portion 236' transitions from the third diameter D3 to the second diameter D2. The fourth portion 236' extends along an axis A4, which is transverse to the axis A3 and the longitudinal axis 140 (FIG. 1). In one example, the fourth portion 236' is at an acute angle, which in this example, is the angle β relative to the axis A3.

In this example, the interior surface 242' of the case wall 218' is coupled to the containment ring 204' at the second portion 232 and the third portion 234'. In one example, the interior surface 242' of the second portion 232 and the third portion 234' is coupled to or formed with the containment ring 204' via a respective one of the first plurality of perforations 250 and the second plurality of perforations 252. In one example, each of the first plurality of perforations 250 and the second plurality of perforations 252 include the holes 258 and the ligaments 260, which are defined along a respective one of the first interface 254 and a second interface 256'. The holes 258 defined along the first interface 254 and the second interface 256' result in the ligaments 260 that are frangible, such that each of the ligaments 260 break or fracture to release the containment ring 204' from the engine case section 210'.

Each of the first plurality of perforations 250, the second plurality of perforations 252, the first interface 254 and the second interface 256' extend about a perimeter or circumference of the engine case section 210'. In this example, the first plurality of perforations 250 and the second plurality of perforations 252 are evenly spaced about the perimeter or circumference of the first interface 254 and the second interface 256', respectively, however, in other embodiments, the first plurality of perforations 250 and/or the second plurality of perforations 252 may be unevenly spaced about the perimeter of the engine case section 210'. In this example, the second interface 256' is defined as a section of material formed between the third portion 234' and the containment ring 204'. The second interface 256' interconnects the containment ring 204' to the case wall 218 at the third portion 234'.

The second interface 256' has the thickness T, which is different, and less than, a wall thickness T1 of the case wall 218 and different, and less than, a wall thickness T2' of the containment ring 204'. In certain examples, the thickness T of the first interface 254 and the second interface 256' may be the same as the thickness T1 of the case wall 218'. The first interface 254 and the second interface 256' each extend for the distance DT1, which is predetermined to provide for a gap 262' to be defined between the containment ring 204' and the interior surface 242' of the case wall 218'. The gap 262' provides a volume for the containment ring 204' to deform, release, break or fracture from the engine case section 210' without cracking, ripping or tearing the engine case section 210'. The second interface 256' is defined so as to extend along an axis A7', which is substantially parallel to the axis A4 of the fourth portion 236 and the longitudinal axis 140 (FIG. 2). The axis A7' is substantially transverse to the axis A3 of the third portion 234'. In one example, the second interface 256' is defined at about a 45 degree angle relative to the third portion 234'.

The containment ring 204' defines a substantially C-shape, and includes a body 270', a first leg 272' and a second leg 274'. In this example, the containment ring 204' is hollow, such that the body 270', the first leg 272' and the second leg 274' are hollow between the first ring surface 276 and the second ring surface 278. Generally, in this example, each of the body 270', the first leg 272' and the second leg 274' are formed by a plurality of exterior wall segments that cooperate to form the containment ring 204' and to enclose an empty chamber **204*a*'. The first leg 272' defines a first side of the containment ring 204', and the second leg 274' defines a second side of the containment ring 204'. The exterior wall segments of the first leg 272' are coupled to or formed with the exterior wall segments of the body 270' at a first body end 270*a*', and the exterior wall segments of the second leg 274' are coupled to or formed with the exterior wall segments of the body 270' at a second body end 270*b*' of the body 270'. The first leg 272' and the second leg 274' each extend at the angle γ relative to the body 270'. Each of the first leg 272' and the second leg 274' extend for the distance DT2. The distance DT2 is different, and less than, a distance DT3 of the second portion 232 and is different and less than a distance DT4 of the fourth portion 236. The distance DT2 of the first leg 272' and the second leg 274' is predetermined such that the containment ring 204' is substantially nested within the engine case section 210' along the diameter D3, with the second leg 274' extending slightly beyond the interior surface 242' of the fifth portion 238. By extending beyond the fifth portion 238, the second leg 274'** assists in providing containment.

In this example, the second leg 274' includes at least one exit hole 280. The exit hole 280 is defined along the second leg 274' proximate the second body end 270*b*' to provide an outlet for unused material during the forming of the first containment system 200' via additive manufacturing. It should be noted that the position of the exit hole 280 is merely exemplary, as the exit hole 280 may be defined at any desired location along the containment ring 204' to provide the outlet for the material during forming of the containment ring 204'. The containment ring 204' also includes a first ring surface 276' opposite the second ring surface 278. The first ring surface 276' faces the interior surface 242' of the engine case section 210', and the second ring surface 278 faces toward the combustion chamber 118 and the radial turbine 120 (FIG. 1). The first ring surface 276' of the containment ring 204' at the first leg 272' is coupled to the first interface 254, and the first ring surface 276 at the second body end 270*b*' is coupled to the second interface 256'. The second interface 256' is defined between the engine case section 210 and the body 270' along the first ring surface 276' at the second body end 270*b*', however, in other examples, the second interface 256' may be formed at other locations, such as along the first ring surface 276' of the second leg 274'. The containment ring 204' may provide additional mass savings compared to the containment ring 204, which may be desirable in certain implementations. In addition, the hollow containment ring 204' provides a layered approach to energy absorption during a containment event. In this regard, in this example, the second ring surface 278 is a first layer, the first ring surface 276' is a second layer, and the engine case section 210' is a third layer. The first layer or second ring surface 278 may be the first to deform, absorbing energy, before the second layer or the first ring surface 276', deforms, absorbing energy, before reaching the third layer or engine case section 210'. This layered approach to energy absorption may be desirable in certain applications of the first containment system 200.

Figure 6:
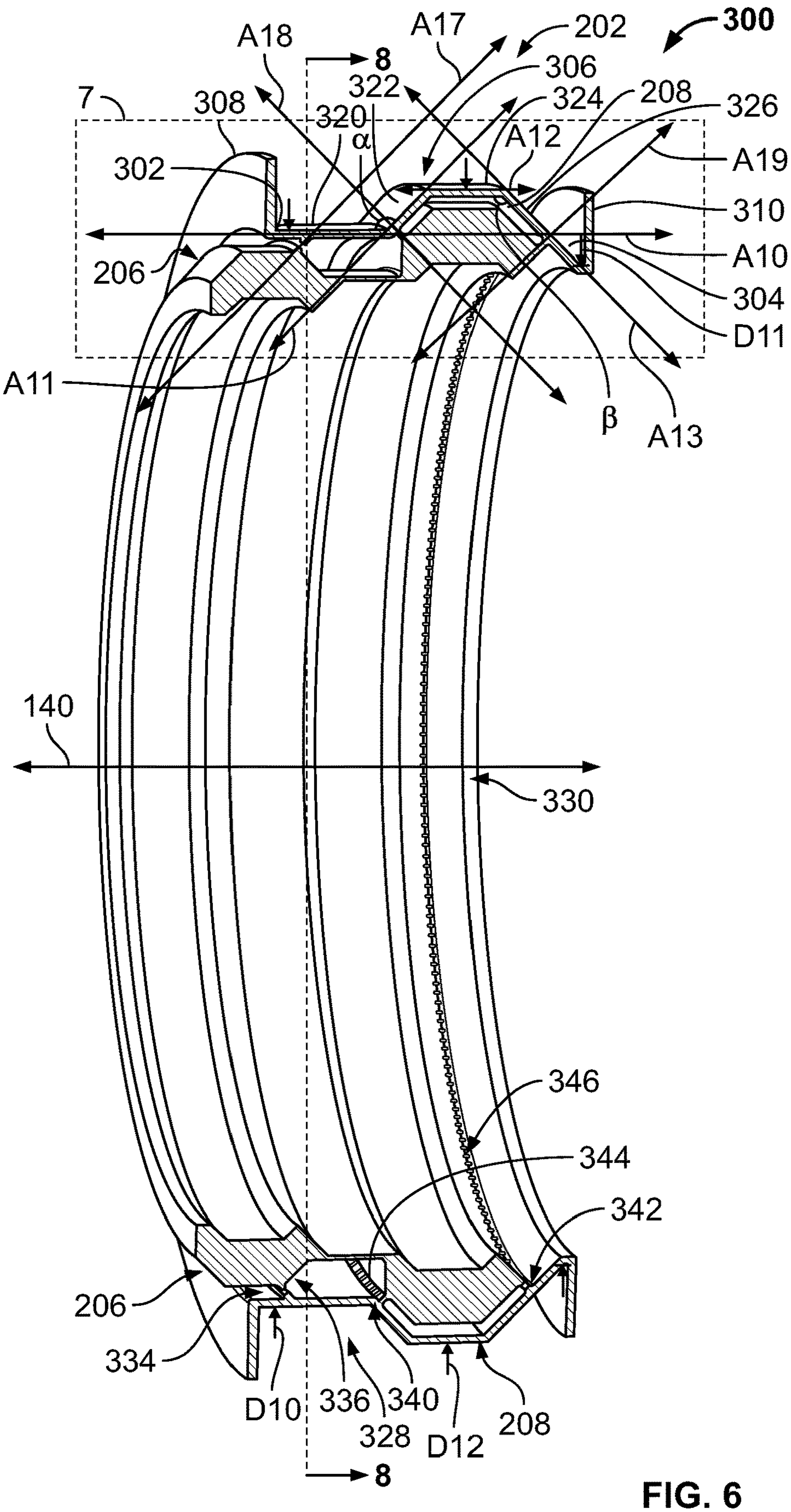
FIG. 6 is a cross-sectional illustration of a second containment system, taken along a plane parallel to a longitudinal axis of the gas turbine engine looking into the page of FIG. 1.

With reference to FIG. 6, the second containment system 202 is shown in greater detail. In one example, the second containment system 202 includes an engine case section 300, the containment ring 206 and the containment ring 208. In this example, the containment ring 206 and the containment ring 208 are each integrally formed, monolithic or one-piece with the engine case section 300. The containment ring 206, the containment ring 208 and the engine case section 300 are composed of a metal or metal alloy, including, but not limited to, Inconel 718. In one example, the containment ring 206, the containment ring 208 and the engine case section 300 are formed using additive manufacturing, including, but not limited to direct metal laser sintering (DMLS), laser powder bed fusion (L-PBF), electron powder bed fusion (E-PBF) or electron beam melting (EBM). As will be discussed, the containment ring 206 and the containment ring 208 are each frangible, and break or fracture to release all or a portion of the respective containment ring 206 and/or the containment ring 208 from the engine case section 300 during a containment event.

In this example, the engine case section 300 includes a first case end 302 opposite a second case end 304 and a case wall 306 that interconnects the first case end 302 and the second case end 304. The first case end 302 includes a first flange 308, which extends radially from the first case end 302. The first flange 308 is coupled to the adjacent engine case section 102 (FIG. 1) to form the engine case 104 (FIG. 1). The second case end 304 includes a second flange 310. The second flange 310 extends radially from the second case end 304 and is coupled to the adjacent engine case section 102 (FIG. 1) to form the engine case 104 (FIG. 1).

The case wall 306 transitions from a first diameter D10 at the first case end 302 to a second diameter D11 at the second case end 304, and the first diameter D10 is different, and greater than, the second diameter D11. The case wall 306 also has a third diameter D12 defined between the first diameter D10 at the first case end 302 and the second diameter D11 at the second case end 304. The third diameter D12 is different than the first diameter D10 and the second diameter D11, and is greater than the first diameter D10 and the second diameter D11. The second diameter D11 is less than the first diameter D10, and less than the third diameter D12. The third diameter D12 is greater than the first diameter D10 and the second diameter D11 to accommodate the containment ring 208.

The case wall 306 includes a first portion 320, a second portion 322, a third portion 324 and a fourth portion 326. The case wall 306 also has an exterior surface 328 and an interior surface 330. The first portion 320 is coupled or formed with the second portion 322 and the first flange 308 at the first case end 302. The first portion 320 extends along an axis A10, which is substantially parallel to the longitudinal axis 140. As will be discussed, the first portion 320 is coupled to the containment ring 206 along the interior surface 330 of the first portion 320. In this example, the first portion 320 is radially outboard of the containment ring 206. Stated another way, the containment ring 206 is nested within the perimeter of the case wall 306 so as to be radially inboard of the first portion 320. In this example, a portion of the containment ring 206 extends beyond the first case end 302 such that the first portion 320 extends over part of the containment ring 206. Stated another way, a portion of the containment ring 206 extends axially beyond a perimeter of the first portion 320 of the engine case section 300. It should be noted that in other examples, the first portion 320 may extend over an entirety of the containment ring 206.

The second portion 322 is coupled or formed with the first portion 320 and the third portion 324. The second portion 322 extends along an axis A11, which is transverse to the axis A10 and the longitudinal axis 140. In one example, the second portion 322 is at an acute angle, which in this example, is the angle $\alpha$ relative to the axis A10. The second portion 322 transitions the case wall 306 from the first diameter D10 to the third diameter D12. As will be discussed, the second portion 322 is coupled to the containment ring 208 along the interior surface 330 of the second portion 322. The third portion 324 is coupled or formed with the fourth portion 326. The third portion 324 extends along an axis A12, which is transverse to the axis A11 and substantially parallel to the longitudinal axis 140. The third portion 324 defines the third diameter D12. In this example, the third portion 324 is radially outboard of the containment ring 208. Stated another way, the containment ring 208 is nested within the perimeter of the case wall 306 so as to be radially inboard of the third portion 324. Generally, by forming the containment ring 208 with the engine case section 300, the diameter D10, D11 of the engine case section 300 may be reduced forward and aft of the containment ring 208, which reduces a weight of the engine case section 300.

The fourth portion 326 is coupled to or formed with the third portion 324 and the second flange 310. The fourth portion 326 transitions from the third diameter D12 to the second diameter D11. The fourth portion 326 extends along an axis A13, which is transverse to the axis A12 and the longitudinal axis 140. In one example, the fourth portion 236 is at an acute angle, which in this example, is the angle θ relative to the axis A12. As will be discussed, the fourth portion 326 is coupled to the containment ring 208 along the interior surface 330 of the fourth portion 326.

Figure 7:
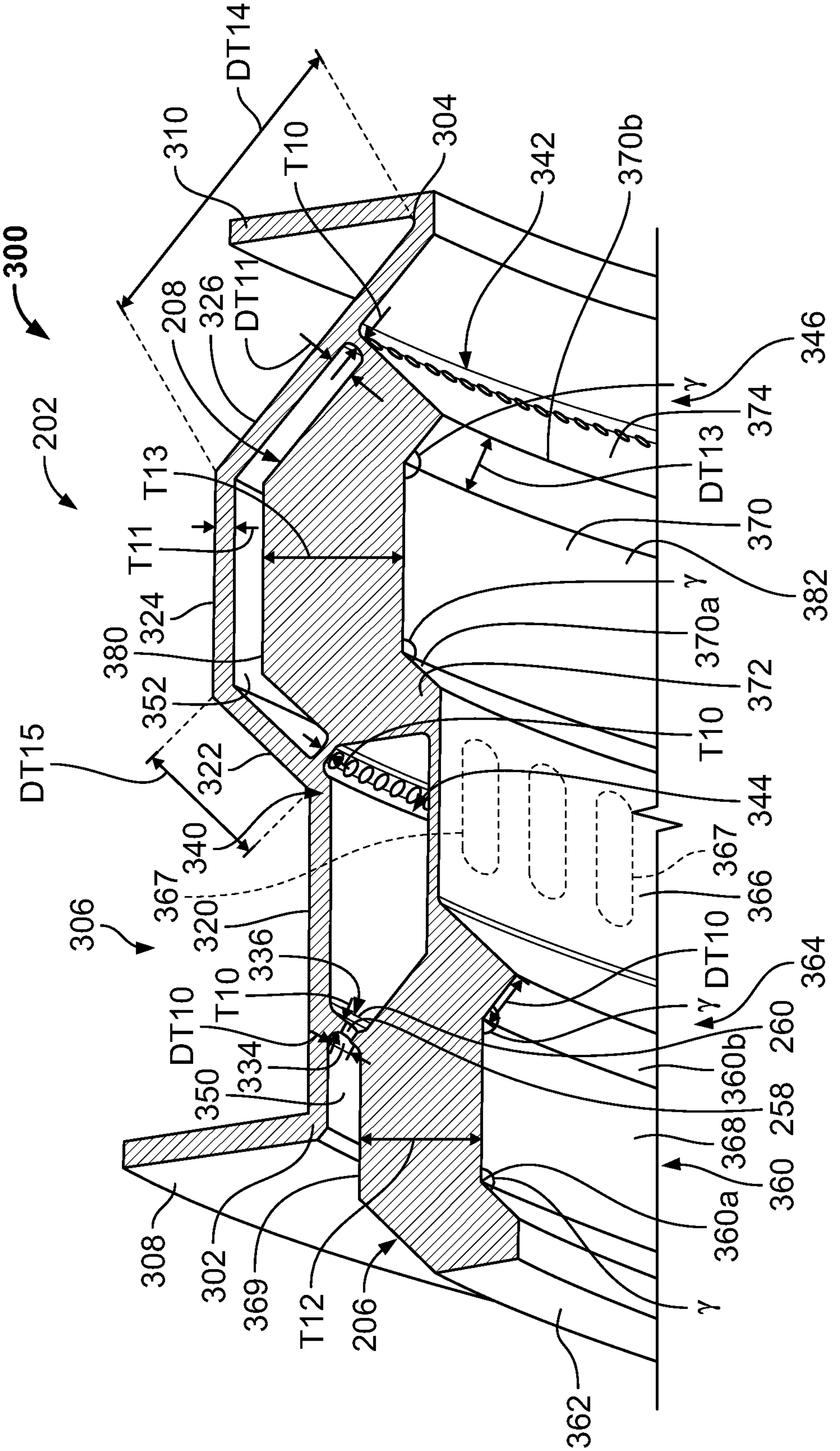
FIG. 7 is a detail cross-sectional view of the second containment system of FIG. 6, taken at 7 on FIG. 6.

The exterior surface 328 of the case wall 306 is opposite the interior surface 330. The exterior surface 328 defines a portion of an outer perimeter of the engine case 104 (FIG. 1). In this example, the interior surface 330 faces a portion of the turbine section 110. The interior surface 330 of the case wall 306 is coupled to the containment ring 206 at the first portion 320. The interior surface 330 is coupled to the containment ring 208 at the second portion 322 and the fourth portion 326. In one example, the interior surface 330 of the first portion 320 is coupled to or formed with the containment ring 206 via a third plurality of perforations 334. With reference to FIG. 7, a detail view of the case wall 306 and the containment ring 206 is shown. In one example, the third plurality of perforations 334 includes the holes 258 and the ligaments 260, which are defined along a third interface 336. It should be noted that the holes 258 of the third plurality of perforations 334 may have any predetermined hole configuration, including, but not limited to, an oval, racetrack, rectangular, diamond or polygonal shape. In one example, the third plurality of perforations 334 include about 300 to about 500 holes 258. The holes 258 defined along the third interface 336 result in the ligaments 260 disposed between adjacent ones of the plurality of holes 258. The ligaments 260 interconnect the case wall 306 with the containment ring 206 and are frangible, such that each of the ligaments 260 break or fracture to release at least a portion of the containment ring 206 from the engine case section 300. Generally, each of the ligaments 260 are defined by a predetermined thickness, which is based on a production capability of the additive manufacturing device and the material from which the engine case section 300 and the containment ring 206 is composed. In one example, each of the ligaments 260 has the thickness of about 0.040 inches (in.), and the holes 258 of each of the third plurality of perforations 334 are defined about a perimeter or circumference of the engine case section 300 to result in each of the ligaments 260 having substantially the same thickness.

The interior surface 330 of the second portion 322 and the fourth portion 326 are also coupled to or formed with the containment ring 208 via a respective one of a fourth plurality of perforations 340 and a fifth plurality of perforations 342. In one example, each of the fourth plurality of perforations 340 and the fifth plurality of perforations 342 includes the holes 258 and the ligaments 260, which are defined along a respective one of a fourth interface 344 and a fifth interface 346. It should be noted that the holes 258 of each of the fourth plurality of perforations 340 and the fifth plurality of perforations 342 may have any predetermined hole configuration, including, but not limited to, an oval, racetrack, rectangular, diamond or polygonal shape. In one example, the fourth plurality of perforations 340 and the fifth plurality of perforations 342 include about 300 to about 500 holes 258. The holes 258 defined along the fourth interface 344 and the fifth interface 346 result in the ligaments 260 disposed between adjacent ones of the plurality of holes 258.

The ligaments 260 interconnect the case wall 306 with the containment ring 208 and are frangible, such that each of the ligaments 260 break or fracture to release at least a portion of the containment ring 208 from the engine case section 300. Generally, each of the ligaments 260 are defined by a predetermined thickness, which is based on a production capability of the additive manufacturing device and the material from which the engine case section 300 and the containment ring 208 is composed. In one example, each of the ligaments 260 has the thickness of about 0.040 inches (in.), and the holes 258 of each of the fourth plurality of perforations 340 and the fifth plurality of perforations 342 are defined about a perimeter or circumference of the engine case section 300 to result in each of the ligaments 260 having substantially the same thickness.

Figure 8:
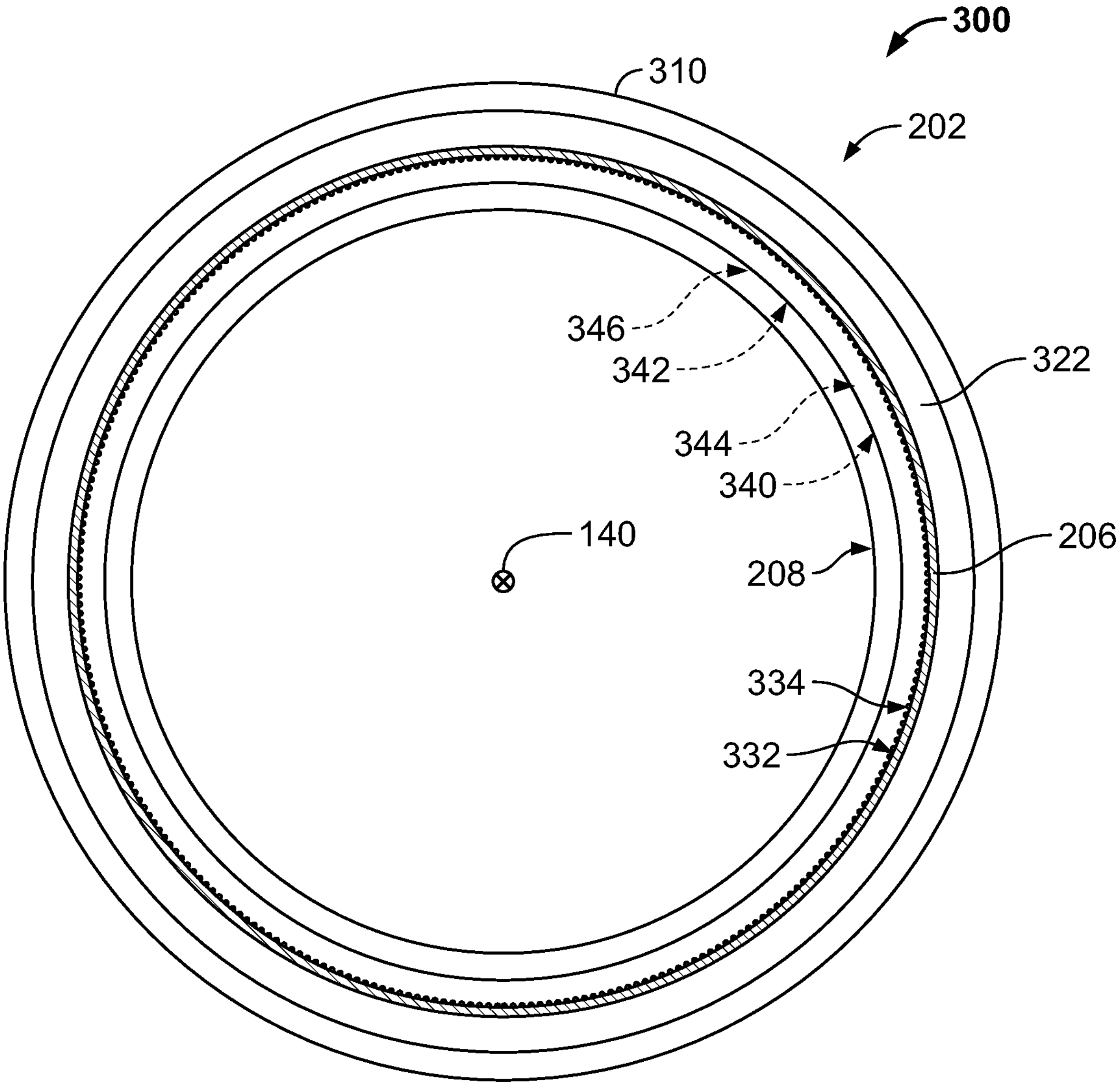
FIG. 8 is a cross-sectional view of the second containment system of FIG. 2, taken along line 8-8 of FIG. 6.

With reference to FIG. 8, each of the third plurality of perforations 334, the fourth plurality of perforations 340 and the fifth plurality of perforations 342, the third interface 336, the fourth interface 344 and the fifth interface 346 extend about a perimeter or circumference of the engine case section 300. In this example, the third plurality of perforations 334, the fourth plurality of perforations 340 and the fifth plurality of perforations 342 are evenly spaced about the perimeter or circumference of the third interface 336, the fourth interface 344 and the fifth interface 346, respectively, however, in other embodiments, the third plurality of perforations 334, the fourth plurality of perforations 340 and the fifth plurality of perforations 342 may be unevenly spaced about the perimeter of the engine case section 300. In this example, with reference back to FIG. 7, the third interface 336 is defined as a section of material formed between the first portion 320 and the containment ring 206, and the fourth interface 344 is defined as a section of material formed between the second portion 322 and the containment ring 208. The fifth interface 346 is defined as a section of material formed between the fourth portion 326 and the containment ring 208. The third interface 336 interconnects the containment ring 206 to the case wall 306 at the first portion 320. The fourth interface 344 interconnects the containment ring 208 to the case wall 306 at the second portion 322, and the fifth interface 346 interconnects the containment ring 208 to the case wall 306 at the fourth portion 326.

Generally, each of the third interface 336, the fourth interface 344 and the fifth interface 346 have a thickness T10, which is different, and less than, a wall thickness T11 of the case wall 306 and different, and less than, a thickness T12 of the containment ring 206 and a thickness T13 of the containment ring 208. In certain examples, the thickness T10 of the third interface 336, the fourth interface 344 and the fifth interface 346 may be the same as the thickness T11 of the case wall 306. The third interface 336 extends for a distance DT10, which is predetermined to provide for a gap 350 to be defined between the containment ring 206 and the interior surface 330 of the case wall 306. The fourth interface 344 and the fifth interface 346 each extend for a distance DT11, which is predetermined to provide for a gap 352 to be defined between the containment ring 208 and the interior surface 330 of the case wall 306. The gaps 350, 352 provide a volume for the respective one of the containment ring 206 and the containment ring 208 to deform, release, break or fracture from the engine case section 300 without cracking, ripping, or breaking the engine case section 300. This ensures that the engine case 104 remains intact during a containment event. With reference to FIG. 6, the third interface 336 is defined so as to extend along an axis A17, which is substantially transverse to the axis A10 of the first portion 320 and the longitudinal axis 140. In one example, the third interface 336 is defined at about an angle of 40 to 50 degrees relative to the first portion 320. The fourth interface 344 is defined so as to extend along an axis A18, which is substantially perpendicular to the axis A11 of the second portion 322 and the longitudinal axis 140. In one example, the fourth interface 344 is defined at about a 90 degree angle relative to the second portion 322. The fifth interface 346 is defined so as to extend along an axis A19, which is substantially perpendicular to the axis A13 of the fourth portion 326 and the longitudinal axis 140. In one example, the fifth interface 346 is defined at about a 90 degree angle relative to the fourth portion 326.

With reference to FIG. 7, the containment ring 206 defines a substantially C-shape, and includes a body 360, a first leg 362 and a second leg 364. The first leg 362 is coupled to or formed with a first body end 360*a* of the body 360, and the second leg 364 is coupled to or formed with a second body end 360*b* of the body 360. The first leg 362 defines a first side of the containment ring 206, and the second leg 364 defines a second side of the containment ring 206. In this example, the first leg 362 and part of the body 360 extend axially beyond the first flange 308 such that the first leg 362 and the portion of the body 360 are not contained within or are external to the engine case section 300. The first leg 362 and the second leg 364 each extend at the angle γ relative to the body 360. Each of the first leg 362 and the second leg 364 extend for a distance DT10. The second leg 364 is coupled or formed with a first leg 372 of the containment ring 208.

In this example, a bridge 366 is defined between the second leg 364 of the containment ring 206 and the first leg 372 of the containment ring 208. The bridge 366 is an interface between the containment ring 206 and the containment ring 208. The bridge 366 extends along an axis substantially parallel to the axis A10 and substantially parallel to the longitudinal axis 140 (FIG. 6). The bridge 366 has a wall thickness T14, which is different and less than the thickness T10. The thin wall thickness T14 of the bridge 366 enables the bridge 366 to fracture, break or release the containment ring 206 from the containment ring 208. Thus, in this example, the containment ring 206 is coupled to the containment ring 208 to assist in containing an event associated with the turbine section 110. It should be noted that in certain examples, the bridge 366 may include one or more holes 367, which may be defined so as to be spaced apart about the circumference of the bridge 366. The holes 367 may have an oval shape, however, the holes 367 may have any desired polygonal shape, such as rectangle, square, diamond, circular, teardrop, etc. The holes 367 provide an additional weight savings for the second containment system 202.

The containment ring 206 includes a first ring surface 368 opposite a second ring surface 369. The first ring surface 368 faces the interior surface 330 of the engine case section 300, and the second ring surface 369 faces toward the forward or upstream (in a direction of working flow through the gas turbine engine 100) axial turbine 122 of the turbine section 110 (FIG. 1). The containment ring 206 extends below the first portion 320 to assist in providing containment for the forward or upstream one of the axial turbines 122. The first ring surface 368 of the containment ring 206 at the second body end 360*b* is coupled to the third interface 336.

The containment ring 208 defines a substantially C-shape, and includes a body 370, the first leg 372 and a second leg 374. The first leg 372 is coupled to or formed with a first body end 370*a* of the body 370, and the second leg 374 is coupled to or formed with a second body end 370*b* of the body 370. The first leg 372 defines a first side of the containment ring 208, and the second leg 374 defines a second side of the containment ring 208. The first leg 372 is also coupled to or formed with the bridge 366. The first leg 372 and the second leg 374 each extend at the angle γ relative to the body 370. Each of the first leg 372 and the second leg 374 extend for a distance DT13. The distance DT13 is different, and less than, a distance DT14 of the fourth portion 326 and is different and less than a distance DT15 of the second portion 322. The distance DT13 of the first leg 372 and the second leg 374 is predetermined such that the containment ring 208 is substantially nested within the engine case section 300 along the diameter D12, with the first leg 372 extending beyond the interior surface 330 of the first portion 320 to connect to the containment ring 206. The containment ring 208 also includes a first ring surface 380 opposite a second ring surface 382. The first ring surface 380 faces the interior surface 330 of the engine case section 300, and the second ring surface 382 faces toward a downstream (in a direction of working flow through the gas turbine engine 100) axial turbine 122 of the turbine section 110. Thus, the containment ring 208 is downstream of the containment ring 206 in the direction of the working fluid flow through the gas turbine engine 100 (FIG. 1).

The first ring surface 380 of the containment ring 208 at the first leg 372 is coupled to the fourth interface 344, and the first ring surface 380 at the second leg 374 is coupled to the fifth interface 346. The third interface 336 is defined between the engine case section 300 and the body 360 along the first ring surface 368 at the second body end 360*b*, however, in other examples, the third interface 336 may be formed at other locations such as along the first ring surface 368 of the second leg 374. The fourth interface 344 is defined between the engine case section 300 and the first leg 372 along the first ring surface 380 at an end of the first leg 372. The fifth interface 346 is defined between the engine case section 300 and the second leg 374 along the first ring surface 380 at an end of the second leg 374. In other examples, the fourth interface 344 and the fifth interface 346 may be formed at other locations along the first ring surface 380 of the first leg 372 and the second leg 374, respectively.

Figure 9:
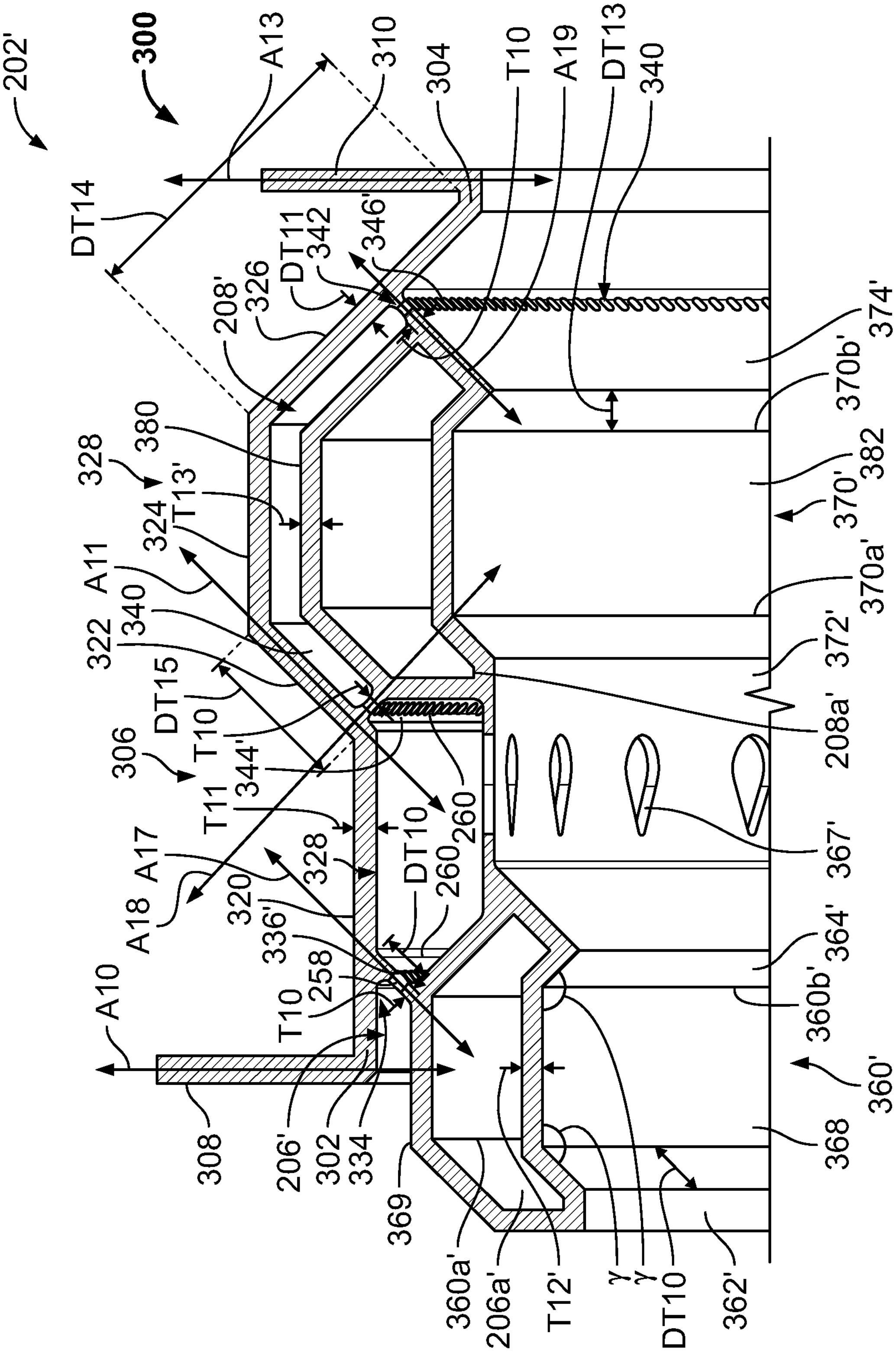
FIG. 9 is a detail cross-sectional view of another exemplary second containment system from the perspective of 7 on FIG. 6.

The containment rings 206, 208 are shown herein as solid, such that the respective one of the body 360, 370, the first leg 362, 372 and the second leg 364, 374 are solid between the respective first ring surface 368, 380 and the second ring surface 369, 382. It should be noted that in other embodiments, the containment rings 206, 208 may be configured differently. For example, with reference to FIG. 9, a second containment system 202' is shown, which is also axisymmetric about the longitudinal axis 140 (FIG. 1). As the second containment system 202' includes features that are substantially similar to or the same as the second containment system 202 discussed with regard to FIGS. 1 and 6-8, the same reference numerals will be used to denote the same or similar features. In one example, the second containment system 202' includes the engine case section 300, a containment ring 206' and a containment ring 208'. In this example, the containment ring 206' and the containment ring 208' are each integrally formed, monolithic or one-piece with the engine case section 300. The containment ring 206', the containment ring 208' and the engine case section 300 are composed of a metal or metal alloy, including, but not limited to, Inconel 718. In one example, the containment ring 206', the containment ring 208' and the engine case section 300 are formed using additive manufacturing, including, but not limited to direct metal laser sintering (DMLS), laser powder bed fusion (L-PBF), electron powder bed fusion (E-PBF) or electron beam melting (EBM). As will be discussed, the containment ring 206' and the containment ring 208' are each frangible, and break or fracture to release all or a portion of the respective containment ring 206' and/or the containment ring 208' from the engine case section 300 during a containment event.

In this example, a portion of the containment ring 206' extends axially beyond a perimeter of the first portion 320 of the engine case section 300. It should be noted that in other examples, the first portion 320 may extend over an entirety of the containment ring 206'. The containment ring 208' is nested within the perimeter of the case wall 306 so as to be radially inboard of the third portion 324. The interior surface 330 of the case wall 306 is coupled to the containment ring 206' at the first portion 320. The interior surface 330 is coupled to the containment ring 208' at the second portion 322 and the fourth portion 326. In one example, the interior surface 330 of the first portion 320 is coupled to or formed with the containment ring 206' via the third plurality of perforations 334 along a third interface 336'. The ligaments 260 interconnect the case wall 306 with the containment ring 206' and are frangible, such that each of the ligaments 260 break or fracture to release at least a portion of the containment ring 206' from the engine case section 300. The interior surface 330 of the second portion 322 and the fourth portion 326 are also coupled to or formed with the containment ring 208' via the respective one of the fourth plurality of perforations 340 and the fifth plurality of perforations 342. The ligaments 260 interconnect the case wall 306 with the containment ring 208' and are frangible, such that each of the ligaments 260 break or fracture to release the containment ring 208' from the engine case section 300.

Each of the third plurality of perforations 334, the fourth plurality of perforations 340 and the fifth plurality of perforations 342, the third interface 336', the fourth interface 344' and the fifth interface 346' extend about a perimeter or circumference of the engine case section 300. In this example, the third plurality of perforations 334, the fourth plurality of perforations 340 and the fifth plurality of perforations 342 are evenly spaced about the perimeter or circumference of the third interface 336', the fourth interface 344' and the fifth interface 346', respectively, however, in other embodiments, the third plurality of perforations 334, the fourth plurality of perforations 340 and the fifth plurality of perforations 342 may be unevenly spaced about the perimeter of the engine case section 300. In this example, the third interface 336' is defined as a section of material formed between the first portion 320 and the containment ring 206', and the fourth interface 344' is defined as a section of material formed between the second portion 322 and the containment ring 208'. The fifth interface 346' is defined as a section of material formed between the fourth portion 326 and the containment ring 208'. The third interface 336' interconnects the containment ring 206' to the case wall 306 at the first portion 320. The fourth interface 344' interconnects the containment ring 208' to the case wall 306 at the second portion 322, and the fifth interface 346' interconnects the containment ring 208' to the case wall 306 at the fourth portion 326.

Generally, each of the third interface 336', the fourth interface 344' and the fifth interface 346' have the thickness T10, which is different, and less than, the wall thickness T11 of the case wall 306 and different, and less than, a wall thickness T12' of the containment ring 206 and a wall thickness T13' of the containment ring 208. In certain examples, the thickness T10 of the third interface 336', the fourth interface 344' and the fifth interface 346' may be the same as the thickness T11 of the case wall 306. The third interface 336' extends for the distance DT10, which is predetermined to provide for the gap 350 to be defined between the containment ring 206' and the interior surface 330 of the case wall 306. The fourth interface 344' and the fifth interface 346' each extend for the distance DT11, which is predetermined to provide for the gap 352 to be defined between the containment ring 208' and the interior surface 330 of the case wall 306. The third interface 336' is defined so as to extend along an axis A17, which is substantially transverse to the axis A10 of the first portion 320 and the longitudinal axis 140 (FIG. 1). In one example, the third interface 336' is defined at about an angle of 40 to 50 degrees relative to the first portion 320. The fourth interface 344' is defined so as to extend along an axis A18, which is substantially perpendicular to the axis A11 of the second portion 322 and the longitudinal axis 140 (FIG. 1). In one example, the fourth interface 344' is defined at about a 90 degree angle relative to the second portion 322. The fifth interface 346' is defined so as to extend along an axis A19, which is substantially perpendicular to the axis A13 of the fourth portion 326 and the longitudinal axis 140. In one example, the fifth interface 346' is defined at about a 90 degree angle relative to the fourth portion 326.

The containment ring 206' defines a substantially C-shape, and includes a body 360', a first leg 362' and a second leg 364'. In this example, the containment ring 206' is hollow, such that the body 360', the first leg 362' and the second leg 364' are hollow between the first ring surface 368 and the second ring surface 369. Generally, in this example, each of the body 360', the first leg 362' and the second leg 364' are formed by a plurality of exterior wall segments that cooperate to form the containment ring 206' and to enclose an empty chamber **206*a*'. The first leg 362' defines a first side of the containment ring 206', and the second leg 364' defines a second side of the containment ring 206'. The exterior wall segments of the first leg 362' are coupled to or formed with the exterior wall segments of the body 360' at a first body end 360*a*', and the exterior wall segments of the second leg 364' are coupled to or formed with the exterior wall segments of the body 360' at a second body end 360*b*' of the body 360'. In this example, the first leg 362' and part of the body 360' extends axially beyond the first flange 308 such that the first leg 362' and the portion of the body 360' are not contained within or are external to the engine case section 300. The first leg 362' and the second leg 364' each extend at the angle γ relative to the body 360. Each of the first leg 362' and the second leg 364' extend for a distance DT10. The second leg 364' is coupled or formed with a first leg 372' of the containment ring 208'. The first ring surface 368 of the containment ring 206 at the second body end 360*b*' is coupled to the third interface 336'. The bridge 366 is defined between the second leg 364' of the containment ring 206' and the first leg 372' of the containment ring 208'. The bridge 366 is an interface between the containment ring 206' and the containment ring 208'. It should be noted that in certain examples, the bridge 366 includes holes 367', which may be defined so as to be spaced apart about the circumference of the bridge 366. The holes 367' may have a teardrop shape, however, the holes 367' may have any desired polygonal shape, such as rectangle, square, diamond, circular, oval, etc. The holes 367' provide an additional weight savings for the second containment system 202'**.

The containment ring 208' defines a substantially C-shape, and includes a body 370', the first leg 372' and a second leg 374'. In this example, the containment ring 208' is hollow, such that the body 370', the first leg 372' and the second leg 374' are hollow between the first ring surface 380 and the second ring surface 382. Generally, in this example, each of the body 370', the first leg 372' and the second leg 374' are formed by a plurality of exterior wall segments that cooperate to form the containment ring 208' and to enclose an empty chamber **208*a*'. The first leg 372' defines a first side of the containment ring 208', and the second leg 374' defines a second side of the containment ring 208'. The exterior wall segments of the first leg 372' are coupled to or formed with the exterior wall segments of the body 370' at a first body end 370*a*', and the exterior wall segments of the second leg 374' are coupled to or formed with the exterior wall segments of the body 370' at a second body end 370*b*' of the body 370'. The first leg 372' is also coupled to or formed with the bridge 366. The first leg 372' and the second leg 374' each extend at the angle γ relative to the body 370'. Each of the first leg 372' and the second leg 374' extend for the distance DT13. The distance DT13 is different, and less than, the distance DT14 of the fourth portion 326 and is different and less than the distance DT15 of the second portion 322. The distance DT13 of the first leg 372' and the second leg 374' is predetermined such that the containment ring 208' is substantially nested within the engine case section 300, with the first leg 372' extending beyond the interior surface 330 of the first portion 320 to connect to the containment ring 206'. The containment ring 208' is downstream of the containment ring 206' in the direction of the working fluid flow through the gas turbine engine 100 (FIG. 1). The first ring surface 380 of the containment ring 208' at the first leg 372' is coupled to the fourth interface 344', and the first ring surface 380 at the second leg 374' is coupled to the fifth interface 346'. The third interface 336' is defined between the engine case section 300 and the body 360' along the first ring surface 368' at the second body end 360*b*', however, in other examples, the third interface 336' may be formed at other locations such as along the first ring surface 368' of the second leg 374'. The fourth interface 344' is defined between the engine case section 300 and the first leg 372' along the first ring surface 380 at an end of the first leg 372'. The fifth interface 346' is defined between the engine case section 300 and the second leg 374' along the first ring surface 380 at an end of the second leg 374'. In other examples, the fourth interface 344' and the fifth interface 346' may be formed at other locations along the first ring surface 380 of the first leg 372' and the second leg 374', respectively. One or both of the second legs 364', 374' may also include the exit hole 280 (FIG. 5), if desired, to enable excess material to exit the respective empty chamber 206*a*', 208*a*'**.

The containment rings 206', 208' may provide additional mass savings compared to the containment rings 206, 208, which may be desirable in certain implementations. In addition, the hollow containment ring 206', 208' provides a layered approach to energy absorption during a containment event. In this regard, in the example of the containment ring 206', the second ring surface 369 is a first layer, the first ring surface 368 is a second layer, and the engine case section 300 is a third layer. The first layer or second ring surface 369 may be the first to deform, absorbing energy, before the second layer or the first ring surface 368, deforms, absorbing energy, before reaching the third layer or engine case section 300. In the example of the containment ring 208', the second ring surface 382 is the first layer, the first ring surface 380 is the second layer, and the engine case section 300 is the third layer. This layered approach to energy absorption may be desirable in certain applications of the second containment system 202.

In addition, it should be noted that the first plurality of perforations 250, the second plurality of perforations 252, the third plurality of perforations 334, the fourth plurality of perforations 340 and the fifth plurality of perforations 342 may all be the same, with the holes 258, or one or more of the first plurality of perforations 250, the second plurality of perforations 252, the third plurality of perforations 334, the fourth plurality of perforations 340 and the fifth plurality of perforations 342 may include holes having different hole configurations. Further, the first plurality of perforations 250, the second plurality of perforations 252, the third plurality of perforations 334, the fourth plurality of perforations 340 and the fifth plurality of perforations 342 may each have the same or a different number of the holes 258. It should also be noted that the first plurality of perforations 250, the second plurality of perforations 252, the third plurality of perforations 334, the fourth plurality of perforations 340 and the fifth plurality of perforations 342 also provide cooling for the containment rings 204, 204', 206, 206', 208, 208' by enabling pressurized air to flow around the containment rings 204, 204', 206, 206', 208, 208', which reduces thermal stresses. The first plurality of perforations 250, the second plurality of perforations 252, the third plurality of perforations 334, the fourth plurality of perforations 340 and the fifth plurality of perforations 342 also ensure that the containment rings 204, 204', 206, 206', 208, 208' remain unloaded by the pressurized air. Stated another way, the first plurality of perforations 250, the second plurality of perforations 252, the third plurality of perforations 334, the fourth plurality of perforations 340 and the fifth plurality of perforations 342 allows the pressurized air to flow around the containment rings 204, 204', 206, 206', 208, 208' and equalize rather than resulting in a differential pressure across the respective containment ring 204, 204', 206, 206', 208, 208', which may add a mechanical stress. The first plurality of perforations 250, the second plurality of perforations 252, the third plurality of perforations 334, the fourth plurality of perforations 340 and the fifth plurality of perforations 342 also enable excess build material to be removed from the gaps 262, 262', 350, 352 upon completion of the forming of the containment rings 204, 204', 206, 206', 208, 208'.

In one example, with reference to FIG. 1, the first containment system 200, 200' and the second containment system 202, 202' may be additively manufactured and installed into the gas turbine engine 100. Generally, the first containment system 200, 200' and the second containment system 202, 202' are formed using additive manufacturing along a build direction that is substantially parallel to the longitudinal axis. The first containment system 200, 200' and the second containment system 202, 202' may be subject to post processing steps, such as hot isostatic pressing, finishing treatments, etc. upon completion. The first containment system 200 and the second containment system 202, 202' are each installed in the gas turbine engine 100 and coupled or connected to the adjacent engine case sections 102 to form the engine case 104. With the first containment system 200, 200' coupled to the adjacent engine case sections 102, the first containment system 200, 200' surrounds the combustion section 112 and the radial turbine 120 to provide containment during an event, and with the second containment system 202, 202' coupled to the adjacent engine case sections 102, the second containment system 202, 202' surrounds the axial turbines 122 of the turbine section 110 to provide containment during an event.

Generally, during a containment event or event requiring containment, in the example of the first containment system 200, 200', once the applied force exceeds the predetermined force threshold, the containment ring 204, 204' fractures or breaks along the first plurality of perforations 250 and/or the second plurality of perforations 252 to fully or partially release a portion of the containment ring 204, 204' from the engine case section 210. In one example, the ligaments 260 of the first plurality of perforations 250 and the second plurality of perforations 252 fracture or break locally at locations along the containment ring 204 that result in a triangulation of the containment ring 204. Stated another way, during a containment event, the containment ring 204, 204' triangulates to absorb the forces and to provide containment. The ligaments 260 of the first plurality of perforations 250 and/or the second plurality of perforations 252 defined along the nodes of the triangle fracture or break to release the containment ring 204, 204' along the nodes. Thus, during a containment event, an entirety of the ligaments 260 of the first plurality of perforations 250 and the second plurality of perforations 252 generally do not fracture or break, but rather the ligaments 260 fracture or break locally to release the containment ring 204, 204' at discrete locations along the perimeter of the containment ring 204, 204'.

During a containment event, in the example of the second containment system 202, 202', once the applied force exceeds the predetermined force threshold, the containment rings 206, 206', 208, 208' fracture or break along the third plurality of perforations 334, the fourth plurality of perforations 340 and/or the fifth plurality of perforations 342 to fully or partially release a portion of the containment rings 206, 206', 208, 208' from the engine case section 300. In one example, the ligaments 260 of the third plurality of perforations 334, the fourth plurality of perforations 340 and the fifth plurality of perforations 342 fracture or break locally at locations along the respective containment rings 206, 206', 208, 208' that result in a triangulation of each of the containment rings 206, 206', 208, 208'. Stated another way, during a containment event, the containment rings 206, 206', 208, 208' triangulate to absorb the forces and to provide containment. The ligaments 260 of the third plurality of perforations 334, the fourth plurality of perforations 340 and the fifth plurality of perforations 342 defined along the nodes of the triangle fracture or break to release the respective containment rings 206, 206', 208, 208' along the nodes. Thus, during a containment event, an entirety of the ligaments 260 of the third plurality of perforations 334, the fourth plurality of perforations 340 and the fifth plurality of perforations 342 generally do not fracture or break, but rather the ligaments 260 fracture or break locally to release the containment rings 206, 206', 208, 208' at discrete locations along the perimeter of the respective containment ring 206, 206', 208, 208'. The bridge 366 may also fracture or break to release the containment ring 206, 206' from the containment ring 208, 208'. In addition, each of the gaps 262, 262', 350, 352 also enable the respective containment rings 204, 204', 206, 206', 208, 208' to triangulate to absorb energy during a containment event.

Thus, the containment systems or the first containment system 200, 200' and the second containment system 202, 202' for the engine, such as the gas turbine engine 100, provide containment during an event with reduced mass. The reduced mass of the first containment system 200, 200' and the second containment system 202, 202' improves specific fuel consumption of the aircraft 99. In addition, as the containment rings 204, 204', 206, 206', 208, 208' are integrally formed with the respective engine case sections 210, 300, additional components, such as mechanical fasteners, flanges, etc. are not needed to couple the containment rings 204, 204', 206, 206', 208, 208' to the engine case sections 210, 300. The reduction in the parts associated with the first containment system 200, 200' and the second containment system 202, 202' reduces assembly time for the gas turbine engine 100, which may also reduce cost.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A containment system for an engine, comprising:

an engine case including a case wall having an inner perimeter that defines an interior surface, an outer perimeter that defines an exterior surface for the engine, the interior surface opposite the exterior surface;

a containment ring nested within the inner perimeter of the engine case and integrally formed with the case wall of the engine case along a first interface and a second interface, the first interface and the second interface each have an interface thickness, the interface thickness less than a thickness of the containment ring, the containment ring including a first leg opposite a second leg and the first interface is defined between the first leg and the case wall of the engine case; and a first plurality of perforations defined at the first interface, each first perforation of the first plurality of perforations separated by a respective one of a first plurality of ligaments, the first plurality of ligaments interconnect the containment ring with the case wall, and the first leg of the containment ring is frangible along the first plurality of perforations to at least partially release the containment ring from the case wall to protect the engine case during a containment event.

2. The containment system of claim 1, wherein the second interface is frangible relative to the case wall of the engine case to at least partially release the containment ring from the case wall during the containment event to protect the engine case.

3. The containment system of claim 2, wherein a second plurality of perforations are defined at the second interface between the second leg and the case wall of the engine case, each second perforation of the second plurality of perforations separated by a respective one of a second plurality of ligaments, the second plurality of ligaments interconnect the containment ring with the case wall, and the containment ring is frangible along the second plurality of perforations.

4. The containment system of claim 2, wherein the containment ring includes a body, with a first body end of the body coupled to the first leg and a second body end of the body coupled to the second leg, and the second interface is defined between the body and the case wall of the engine case at the second body end.

5. The containment system of claim 1, wherein the second interface is defined between the second leg and the case wall of the engine case.

6. The containment system of claim 1, wherein the first plurality of perforations extends about a circumference of the containment ring at the first interface.

7. The containment system of claim 1, further comprising a second containment ring, the second containment ring integrally formed with the case wall of the engine case along a third interface.

8. The containment system of claim 7, wherein the third interface is frangible relative to the case wall of the engine case to at least partially release the second containment ring from the case wall during the containment event to protect the engine case.

9. The containment system of claim 7, wherein the second containment ring is integrally formed with the containment ring such that the second containment ring is connected to the containment ring.

10. The containment system of claim 7, wherein the second containment ring extends axially beyond the inner perimeter of the engine case.

11. The containment system of claim 1, wherein the engine case has a first case end opposite a second case end, the first case end has a first diameter that is different than a diameter of the engine case defined between the first case end and the second case end, and the containment ring is nested within the inner perimeter of the engine case at the diameter.

12. The containment system of claim 11, wherein the engine case defines a plurality of bores proximate the diameter, which are each configured to receive a fuel nozzle associated with the engine.

13. The containment system of claim 1, wherein the containment ring is hollow.

14. The containment system of claim 13, wherein the second leg of the containment ring includes at least one exit hole.

15. A containment system for an engine, comprising:

an engine case including a case wall having an inner perimeter that defines an interior surface and an outer perimeter that defines an exterior surface for the engine, the interior surface opposite the exterior surface;

a containment ring nested within the inner perimeter of the engine case and integrally formed with the case wall of the engine case along a first interface and a second interface, the first interface and the second interface each have an interface thickness, the interface thickness less than a thickness of the containment ring, the containment ring including a body with a first leg and a second leg on opposed sides of the body, the first interface defined between the first leg and the interior surface of the case wall of the engine case, and the second interface defined between the interior surface of the case wall and the body or the second leg;

a first plurality of perforations defined at the first interface, each first perforation of the first plurality of perforations separated by a respective one of a first plurality of ligaments, the first plurality of ligaments interconnect the containment ring with the case wall, and the first leg of the containment ring is frangible along the first plurality of perforations to at least partially release the containment ring from the case wall to protect the engine case during a containment event; and a second plurality of perforations defined at the second interface, each second perforation of the second plurality of perforations separated by a respective one of a second plurality of ligaments, the second plurality of ligaments interconnect the containment ring with the case wall, and the containment ring is frangible along the second plurality of perforations to at least partially release the containment ring from the case wall.

16. The containment system of claim 15, wherein the body has a first body end coupled to the first leg and a second body end coupled to the second leg, and the second interface is defined between the body and the case wall of the engine case at the second body end.

17. The containment system of claim 15, wherein the second interface is defined between the second leg and the case wall of the engine case.

18. The containment system of claim 15, further comprising a second containment ring, the second containment ring integrally formed with the case wall of the engine case along a third interface and the third interface is frangible relative to the engine case to at least partially release the second containment ring from the case wall during the containment event to protect the engine case.

19. The containment system of claim 18, wherein the second containment ring is integrally formed with the containment ring such that the second containment ring is connected to the containment ring and the second containment ring extends axially beyond the inner perimeter of the engine case.

20. The containment system of claim 15, wherein the engine case has a first case end opposite a second case end, the first case end has a first diameter that is different than a diameter of the engine case defined between the first case end and the second case end, and the containment ring is nested within the inner perimeter of the engine case at the diameter.

* * * * *